Feb. 25, 1930.　　　S. STYKA　　　1,748,090
POTATO PLANTER
Filed May 6, 1927　　2 Sheets-Sheet 1
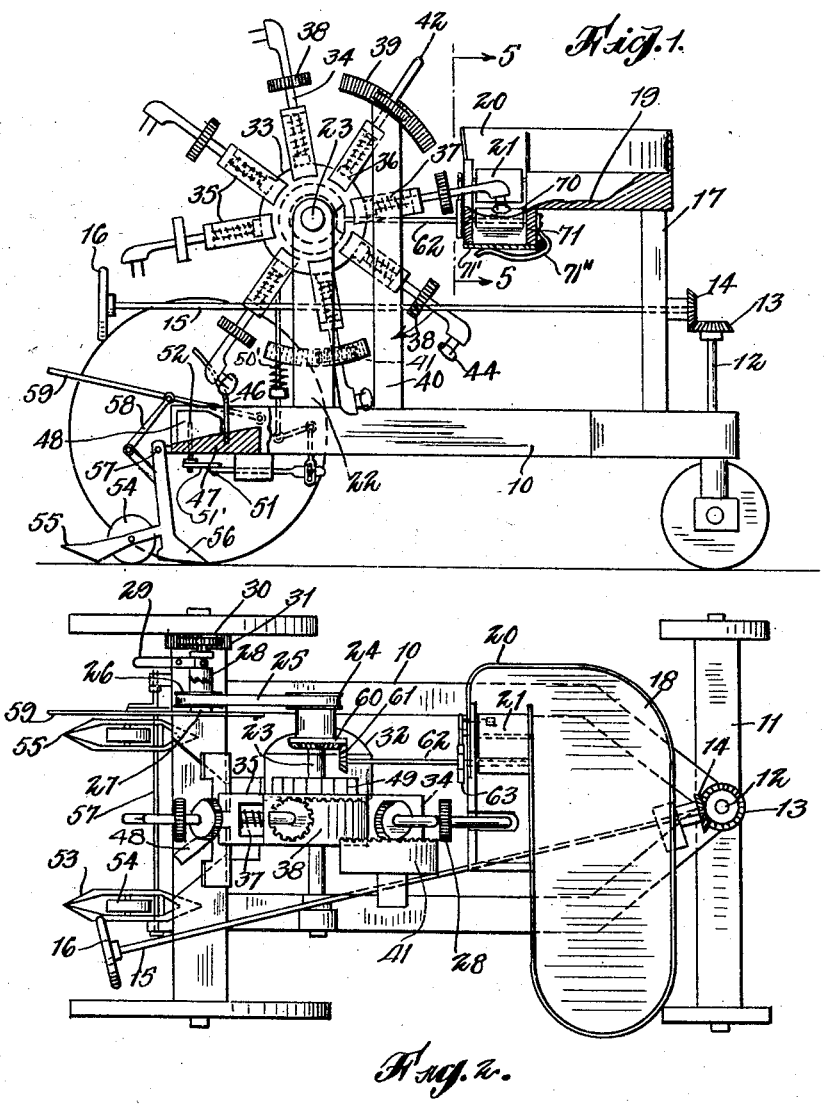
INVENTOR
Stanisław Styka Feb. 25, 1930.  S. STYKA  1,748,090
POTATO PLANTER
Filed May 6, 1927  2 Sheets-Sheet 2
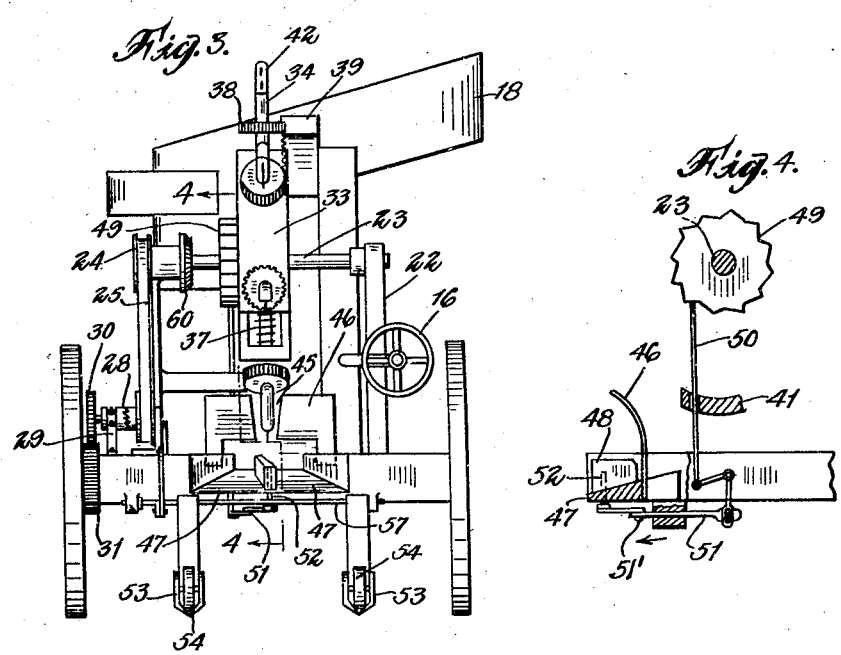
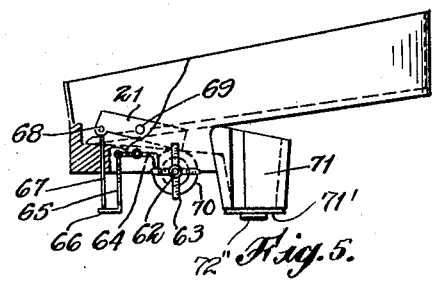
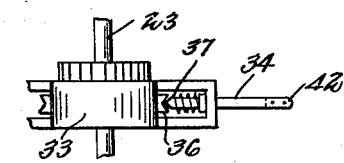
INVENTOR
Stanislaw Styka Patented Feb. 25, 1930

1,748,090

UNITED STATES PATENT OFFICE

STANISLAW STYKA, OF DETROIT, MICHIGAN

POTATO PLANTER

Application filed May 6, 1927. Serial No. 189,357.

This invention relates to improvements in agricultural machines, and particularly to a potato planter, and it is the principal object of my invention to provide a machine permitting during the travel of the machine over the ground to pick one seed potato from a hopper and the planting of two adjoining furrows with the picked up potatoes in their consecutive order.

Another object of my invention is the provision of a potato planter including means for automatically controlling the feeding of the seed potatoes to the pickers delivering the same to the planting devices.

A further object of my invention is the provision of a potato planting machine equipped with means for automatically regulating the distribution of the seed potatoes alternately to one or the other of two adjoining furrows opened in front of the planter and closed behind the distributing means.

A still further object of my invention is the provision of a potato planting machine employing a plurality of rotating pickers, each of which is rotatable and provided with means for locking it or holding it in any of its adjusted positions.

These and other objects and advantages of my invention will become more fully known as the description thereof proceeds and will then be specifically pointed out or defined in the appended claims.

In the accompanying drawing forming a material part of this disclosure:

Fig. 1 is a side elevation of a potato planter constructed according to my invention.

Fig. 2 is a top plan view thereof.

Fig. 3 is a rear end view elevation of the machine.

Fig. 4 is a section on line 4—4 of Figure 3.

Fig. 5 is a section on line 5—5 of Figure 1.

Fig. 6 is a fragmentary detail top plan view of one of the pickers.

As illustrated on the drawings, the machine comprises the wheeled frame 10, the front axle 11 of which is equipped with a steering post 12 carrying at its upper end a bevel gear 13 in mesh with a similar bevel gear 14 at the end of a steering rod 15 carrying at its opposite end a steering hand wheel 16.

Posts 17 vertically erected on the front part of the machine frame carry a hopper 18 inclined towards one side of the machine and adapted to receive the seed potatoes, and having an inclined bottom 19, and at one side making a turn 20 towards the interior of the machine, the opening of said hopper at this point being controlled by means of a movable plate 21 which is regulated in its movements by means of a special mechanism hereinafter more fully to be described.

Near its rear part the frame 10 of the machine carries vertical standards or posts 22 provided at their upper ends with suitable bearings for a horizontally disposed transverse shaft 23 which carries at one of its outer ends a pulley 24 over which a belt 25 is guided, which is also guided over a pulley 26 on a shaft 27 carrying a coupling 28 adapted to be operated by a shifter 29 or the like adapted to engage a gear 30 with a gear 31 on the rear axle of the machine or disengage said gears as the case may be. The axle is driven in the ordinary well known manner from a motor 32 located in the machine frame.

The transverse shaft 23 carries a hub 33 from which radiate a plurality of pickers 34, each comprising a frame socket 35 having its inner end secured in the hub in which the lower ends or inner ends of the picker shafts are rotatably held. The extreme inner ends of these shafts are rotatably held in sockets 36 on the hub or the like, and springs 37 are guided about the shafts of the pickers within the frames 35 and are adapted to hold the picker shafts in any of their adjusted positions. The shafts 34 carry outside of the frames 35 small gears 38 adapted to mesh during the rotation of the pickers with the hub 33 on shaft 23 in clockwise direction, as indicated by the arrow in Figure 1, with a gear segment 39 on a vertical post 40 on the machine frame, and a gear-segment 41 on post 22 on the machine frame oppositely disposed to segment 39, and at a lower level, for rotating the shafts of the pickers. The outer ends of the picker-shafts 34 carry each a head 42 having a pair of prongs 43 secured therein adapted to pick up a potato from the delivery means of the hopper during the revolution of the pickers. The potato 44 picked by the prongs from the hopper delivery means is carried to the rear of the machine and removed from the prongs of the picker during the passage of the same or its head through a slot 45 in a curved plate 46 on the machine frame, said slot having a suitably selected width. The potato released from the picker head falls into or is delivered to a chute 47 having a rearwardly inclined bottom and which is divided by means of a movable partition 48 into two channels diverging to opposite sides for delivering one potato into one of the furrow feeders on one side of the machine and the next following potato into the furrow feeder at the opposite side of the machine.

This movable partition 48 is governed in its movements or controlled by the following mechanism: On shaft 23 is provided in juxtaposition to hub 33 a sprocket wheel 49, the teeth of which engage the upper end of a downwardly extending rod 50, spring-cushioned, as at 50′, and guided through a groove in the side of the segment 41 and adapted to actuate with its lower end a system of levers, generally designated 51. The lowermost lever of this system has its end formed into an eye in which is guided a pin at the end of the lever 51 sliding in a block in the direction of the arrow, Figure 4, and has attached to its first end by a joint 51′ a short link, the extreme outer end of which carries a pin 52 secured in the partition wall 48 at its bottom edge so that upon rotation of shaft 23 and sprocket wheel thereon, the partition is alternately turned towards one side or the other in order to direct the potatoes alternately to slide down one or the other part of the inclined bottom of the chute 47. The potatoes then fall alternately into one or the other of the furrow-feeders 53 on the sides of the machine, each of which comprises a shoe in which a wheel 54 is rotating the rear ends of which are pointed, as at 55, and adapted to open the furrow while the potatoes fall behind the wheel 54 in the shoe, and furrow levelers 56 suspended from a connecting rod 57 adapted to be elevated and lowered by means of a bell-crank lever 58 adapted to be operated by a lever 59. It will be clear that by moving lever 59 upwardly, the bell-crank lever 58 will straighten and keep the feeders elevated above the ground, while upon the depression of lever 59 the bell-crank lever 58 will assume the position shown in Figure 1, with the feeders 53 moving toward the ground.

The movable plate 21 controlling the delivery of the seed potatoes from the hopper is operated from and controlled by the following mechanism: Shaft 23 carries between sprocket wheel 49 and pulley 24 a bevel gear 60 in mesh with a bevel gear 61 on a shaft 62, the opposite end of which carries a star-wheel 63 the branches of which are adapted to successively engage during the rotation of the wheel the lower bent end of a lever 64 pivoted intermediate its ends, and having to one of its ends pivotally connected a rod 65 with a lower angular finger 66 adapted to engage and operate the lower end of a vertical rod 67, the upper end of which is pivotally attached to one end of plate 21, as at 68, and plate 21 is pivoted intermediate its ends to a rod 69 so that upon each operation by one of the star wheel branches during the travel of the machine over the ground, the foremost potato is leaving the hopper under plate 21 and is moved forward over a roller 70 onto a small distributor element 71 to be picked up by one of the pickers. This element 71 has its lower opening closed by a door 71′ normally pressed shut by means of a spring 71″ of suitably selected strength so as to open by the weight of a potato placed by the pickers into element 71 and will then close again under the action of the spring to receive another potato.

The potato planting machine operates in the following manner: The seed potatoes are supplied to hopper 18 and roll down the inclined bottom thereof until they are stopped by the movable plate 21. When then the machine is started, the star wheel branches during the rotation of the wheel will lift one end of plate 21 to let the foremost of the potatoes leave the hopper and be placed onto the distributor element 71 to be picked up by the prongs of one of the pickers rotating with hub and shaft 23. During the further rotation of the picker, its gear 38 will come into mesh with the toothed segment 41 and the picker shaft will turn to bring the prongs with the potato thereon toward the rear, whereupon during the further rotation of the picker the same will pass through slot 45, the width of which is so selected that the picker may pass while the potato thereon will be removed from the picker and fall onto the inclined platform 47 according to the position of the partition wall to roll down into one or the other of the furrow feeders 53, while the potato on the next following picker will fall down into the furrow feeder on the opposite side, as in the meantime the partition wall during the rotation of the sprocket wheel 49 with the picker shaft 23 will have changed the position of the partition accordingly. The springs 37 will hold the picker shafts in their adjusted position until during the further rotation of the pickers, their gear 38 comes into engagement with the toothed segment 39 to turn the heads of the pickers again into position to engage one of the seed potatoes.

It will be clear that while I have shown and described the preferred form of my machine as an example, I can make such changes in its construction as come within the scope of the appended claims without departure from the gist of my invention.

Having thus described my invention what I claim as new and desire to secure by Letters Patent is:

1. In a potato planting machine of the class described, the combination of a rotary shaft with means for controlling the delivery of the potatoes to be planted, said means comprising a hopper, a movable plate regulating the delivery of the seed potatoes from said hopper, a star wheel, a shaft for said star wheel, means for transmitting the motion of said rotary shaft to said star wheel shaft, a system of levers adapted to be actuated by the branches of said star wheel during its rotation, an operating rod connected to one end of said plate adapted to be operated by said rod to tilt said plate to permit the passage of the potatoes one by one from the hopper, a roller receiving the delivered potato, a delivery chute, and a plurality of pickers adapted to pick the potatoes successively from said chute.

2. In a potato planter of the class described, the combination of a wheeled frame and a transverse shaft thereon with a plurality of pickers and their shafts, a hub on said shaft with which said pickers rotate, a frame for the lower ends of the picker shafts, secured to said hub, sockets in which said lower ends of the picker shafts are rotatably held, springs in said frame wound about said shafts to hold the same in their adjusted positions, a gear on each picker shaft, means engaging said gear to rotate the shaft, a head on each picker shaft having a plurality of potato engaging prongs thereon adapted to be turned at an angle of 180° at each engagement of the gear with one of its engaging means, and a means for removing the potatoes from the prongs to deliver the same to the furrows.

Signed at Detroit, in the county of Wayne and State of Michigan, this 22nd day of April, A. D. 1927.

STANISLAW STYKA.